(12) United States Patent
Yamada et al.

(10) Patent No.: US 11,267,369 B2
(45) Date of Patent: Mar. 8, 2022

(54) MOTION GUIDING DEVICE AND GROOVE SHIELD UNIT

(71) Applicant: YKK Corporation, Tokyo (JP)

(72) Inventors: Tsutomu Yamada, Novi, MI (US); Tomonari Yoshida, Tokyo (JP); Yoshitomo Iyoda, Tokyo (JP)

(73) Assignee: YKK Corporation, Tokyo (JP)

( * ) Notice: Subject to any disclaimer, the term of this patent is extended or adjusted under 35 U.S.C. 154(b) by 272 days.

(21) Appl. No.: 16/610,858

(22) PCT Filed: May 8, 2017

(86) PCT No.: PCT/JP2017/017405
§ 371 (c)(1),
(2) Date: Nov. 4, 2019

(87) PCT Pub. No.: WO2018/207239
PCT Pub. Date: Nov. 15, 2018

(65) Prior Publication Data
US 2021/0046850 A1 Feb. 18, 2021

(51) Int. Cl.
*B60N 2/00* (2006.01)
*B60N 2/07* (2006.01)

(52) U.S. Cl.
CPC ......... *B60N 2/0725* (2013.01); *B60N 2/0715* (2013.01)

(58) Field of Classification Search
None
See application file for complete search history.

(56) References Cited

U.S. PATENT DOCUMENTS

| 6,145,911 | A | 11/2000 | Sturt et al. | |
|---|---|---|---|---|
| 6,460,818 | B1 * | 10/2002 | Garelick | B60N 2/0715 248/298.1 |
| 11,040,639 | B2 * | 6/2021 | Condamin | B60N 2/01541 |
| 2002/0056799 | A1 * | 5/2002 | Fujimoto | B60N 2/072 248/430 |

(Continued)

FOREIGN PATENT DOCUMENTS

| CN | 1353964 A | 6/2002 |
|---|---|---|
| CN | 103596802 A | 2/2014 |

(Continued)

OTHER PUBLICATIONS

International Preliminary Report on Patentability, PCT Patent Application No. PCT/JP2017/017405, dated Nov. 12, 2019, 8 pages.

(Continued)

*Primary Examiner* — Steven M Marsh
(74) *Attorney, Agent, or Firm* — Kilpatrick Townsend & Stockton LLP (57) ABSTRACT

A motion guiding device includes: a lower rail having a guiding groove; an upper rail movably disposed in the guiding groove; a first side cover and a second side cover that are fixed to the lower rail; and a slide fastener held by the first side cover and the second side cover. Each of the first side cover and the second side cover includes: a cover body piece engaged with a fastener tape of the slide fastener such that the fastener tape is movable to open and close the slide fastener; and a fixing piece extending from a surface of the cover body piece. The cover body piece includes a support projection projecting from the surface of the cover body piece.

8 Claims, 10 Drawing Sheets

(56) References Cited

U.S. PATENT DOCUMENTS

| | | | | |
|---|---|---|---|---|
| 2006/0124821 A1* | 6/2006 | McFarlane | ................ | B64F 5/40 |
| | | | | 248/429 |
| 2011/0139954 A1* | 6/2011 | Ruess | .................... | B60N 2/067 |
| | | | | 248/429 |
| 2014/0091610 A1 | 4/2014 | Clark et al. | | |
| 2015/0145298 A1* | 5/2015 | Wottke | ...................... | B64C 1/18 |
| | | | | 297/243 |

FOREIGN PATENT DOCUMENTS

| | | |
|---|---|---|
| EP | 0786370 A1 | 7/1997 |
| JP | S62-041234 U | 3/1987 |
| JP | H07-35162 U | 6/1995 |
| KR | 970036578 A | 7/1997 |
| KR | 20130141685 A | 12/2013 |
| KR | 10-2019-0069705 A | 6/2019 |
| WO | 2010/067437 A1 | 6/2010 |

OTHER PUBLICATIONS

International Search Report, PCT Patent Application No. PCT/JP2017/017405, dated Aug. 1, 2017.
Written Opinion, PCT Patent Application No. PCT/JP2017/017405, dated Aug. 1, 2017.
International Preliminary Report on Patentability, PCT Patent Application No. PCT/US2018/017405, dated Nov. 12, 2019, 8 pages.
Office Action, Chinese Patent Application No. 201780090538.8, dated Jun. 2, 2021.
Notice of Allowance, Korean Patent Application No. 10-2019-7035871, dated Apr. 7, 2021, 3 pages.

* cited by examiner

MOTION GUIDING DEVICE AND GROOVE SHIELD UNIT

TECHNICAL FIELD

The present invention relates to a motion guiding device for guiding a movable member such as a car seat of a vehicle in a moving direction, and a groove shield unit.

BACKGROUND ART

As a typical motion guiding device, a slide rail device including a lower rail (base member) fixed to a vehicle body of a vehicle and an upper rail (movable member) fixed to a seat has been known (see Patent Literature 1). The lower rail has a guiding groove formed along a longitudinal direction of the lower rail. The upper rail is movably disposed along the guiding groove.

An opening of the guiding groove is covered with a pair of mutually engageable groove shield members. Sliders each connected to the pair of groove shield members are attached to opposite ends of the upper rail in a moving direction. Each of the groove shield members includes a drop-off prevention stepped portion. The drop-off prevention stepped portion is received in a housing portion of each of protectors (side covers) fixed to the lower rail.

Each of the side covers includes: a body that is in a substantially square C shape or in a C shape in its entirety and defines the housing portion therein; and a positioning piece extending downward from a lower surface of the body. The housing portion is formed in the body such that the drop-off prevention stepped portion is movable in a direction orthogonal to a longitudinal direction of the groove shield members, thereby bringing the groove shield members into an unshielded state and a shielded state.

In the side cover, a part of the body in contact with an upper surface of the lower rail is fixed to the lower rail, and the positioning piece is fixed to a side wall of the lower rail.

With the above-described slide rail device, in accordance with the movement of the upper rail, one of the sliders, which is at the front of the upper rail in the moving direction, releases the engagement of the groove shield members to unshield the opening while the other one of the sliders, which is at the back of the upper rail in the moving direction, brings the groove shield members into engagement to shield the opening. Since the opening of the guiding groove is thus shielded and unshielded, the opening of the guiding groove is kept in a shielded state, where the opening is shielded by the groove shield members, at the front and the back of the upper rail in the moving direction.

CITATION LIST

Patent Literature(s)

Patent Literature 1: International Publication No. WO2010/067437

SUMMARY OF THE INVENTION

Problem(s) to be Solved by the Invention

In the slide rail device disclosed in Patent Literature 1, the body of the side cover is entirely in a substantially square C shape or in a C shape, and the portion of the body in contact with the lower rail is fixed to the lower rail. Accordingly, an entire thickness of the body is increased by a thickness of the portion.

An object of the invention is to provide a motion guiding device and a groove shield unit which are capable of providing a side cover reduced in thickness.

Means for Solving the Problem(s)

According to an aspect of the invention, a motion guiding device includes: a base member formed with a guiding groove; a movable member (30) movably disposed along the guiding groove; a pair of side covers defining an opening of the guiding groove therebetween; and a slide fastener including a pair of fastener stringers held by the pair of side covers and a pair of sliders attached to opposite ends of the movable member in a moving direction, each of the pair of fastener stringers including: a fastener tape covering the opening of the guiding groove; and a fastener element provided to the fastener tape and connected with the pair of sliders such that the pair of sliders are slidable, each of the pair of side covers including: a cover body piece engaged with the fastener tape such that the fastener tape are movable in a direction intersecting with a moving direction of the movable member to open and close the slide fastener; and a fixing piece extending from the cover body piece and fixed to the base member, the cover body piece including: a support projection projecting from a surface of the cover body piece and formed at a position closer to the fastener tape with respect to the fixing piece.

According to the above aspect of the invention, since a single cover body piece has a part engaged with the fastener tape, the thickness of the body of the side cover is reducible to be slim, as compared with a body entirely formed substantially in a square C-shape or C-shape.

In the motion guiding device according to the above aspect, it is preferable that the cover body piece further includes: an edge at a position closer to the fastener tape with respect to the fixing piece; and a concave groove formed between the edge and the support projection, and the fastener tape includes a bulging portion located in the concave groove.

With this arrangement, when the fastener tape is moved to open and close the slide fastener (hereinafter, occasionally simply referred to as "the opening and closing movement") in accordance with the movement of the movable member, the bulging portion slides between the edge and the support projection within the concave groove. Accordingly, the fastener tape can be avoided from being bent by being pressed onto the side cover at the opening movement.

Moreover, when the bulging portion is in contact with the edge of the cover body piece, the fastener tape is in engagement with the side cover, so that the fastener tape can be avoided from dropping off.

In the motion guiding device according to the above aspect, it is preferable that the support projection includes a tip end (431A) extending toward the edge of the cover body piece, and a dimension of an opening defined between the tip end and the edge is smaller than a diameter of the bulging portion.

With this arrangement, since the opening between the tip end of the support projection and the edge of the cover body piece is formed narrow, the bulging portion of the fastener tape does not drop off from the concave groove of the side cover. Accordingly, the slide fastener and the side cover can be handled in a combined state, which facilitates setting of the slide fastener and attaching of the side cover to the base member.

In the motion guiding device according to the above aspect, it is preferable that the edge of the cover body piece includes an inclined surface on an inner surface forming the concave groove, the inclined surface extending toward the support projections with an inclination directed from the tip end of the support projection to a base end.

With this arrangement, the tip end of the support projection extends toward the edge of the cover body piece. Even when the fastener tape is bent in order to dispose the bulging portion into the concave groove, the inclined surface enables the fastener tape to be guided in a direction for the opening and closing movement, so that the slide fastener can be smoothly opened and closed.

In the motion guiding device according to the above aspect, it is preferable that the support projection is continuous in a longitudinal direction of the cover body piece.

With this arrangement, the support projection can be in contact with the base member along the longitudinal direction of the cover body piece, so that the support projection can support the cover body piece more firmly than, for instance, the support projection partially in contact with the base member in the longitudinal direction of the cover body piece.

In the motion guiding device according to the above aspect, it is preferable that the fastener tape includes at least one elongated hole along a moving direction of the fastener tape to open and close the slide fastener, and the support projection is disposed in the elongated hole.

With this arrangement, since the fastener tape is capable of the opening and closing movement within a range in which the support projection is in no contact with one longitudinal end of the elongated hole, the fastener tape can be avoided from being bent by being pressed onto the side cover by the opening movement.

Moreover, when the support projection is brought into contact with the other longitudinal end of the elongated hole, the fastener tape is engaged with the side cover, so that the fastener tape can be avoided from dropping off.

Further, since the concave groove is not required to be formed between the edge and the support projection in the cover body piece, the width of the cover body piece is reducible.

According to another aspect of the invention, a groove shield unit includes: a pair of side covers; and a slide fastener including a pair of fastener stringers held by the pair of side covers and a pair of sliders connected to the pair of fastener stringers, each of the pair of fastener stringers including: a fastener tape; and a fastener element provided to the fastener tape and connected with the pair of sliders such that the pair of sliders are slidable, each of the pair of side covers including: a cover body piece engaged with the fastener tape such that the fastener tape is movable to open and close the slide faster; and a fixing piece extending from the cover body piece, the cover body piece including: a support projection projecting from a surface of the cover body piece and formed at a position closer to the fastener tape with respect to the fixing piece.

According to the above aspect of the invention, the groove shield unit can produce the same effects as the motion guiding device according to the above aspect of the invention.

In the groove shield unit according to the above aspect, it is preferable that the cover body piece further includes: an edge at a position closer to the fastener tape with respect to the fixing piece; and a concave groove formed between the edge and the support projection, the fastener tape includes a bulging portion located in the concave groove, and the support projection includes a tip end extending toward the edge of the cover body piece.

With this arrangement, at the time of the opening and closing movement of the fastener tape, the bulging portion slides between the edge and the support projection within the concave groove. Accordingly, the fastener tape can be avoided from being bent by being pressed onto the side cover by the opening movement.

Moreover, when the bulging portion is in contact with the edge of the cover body piece, the fastener tape is in engagement with the side cover, so that the fastener tape can be avoided from dropping off.

Further, since the opening between the tip end of the support projection and the edge of the cover body piece is formed narrow, the bulging portion of the fastener tape is unlikely to drop off from the concave groove of the side cover. Accordingly, the slide fastener and the side cover can be handled in a combined state as a single unit, which facilitates setting of the slide fastener and attaching of the side cover to the base member.

According to the above aspects of the invention, a motion guiding device and a groove shield unit which are capable of providing a side cover reduced in thickness can be provided.

DESCRIPTION OF EMBODIMENT(S)

First Exemplary Embodiment

A first exemplary embodiment of the invention will be described below with reference to the attached drawings.

Figure 1:
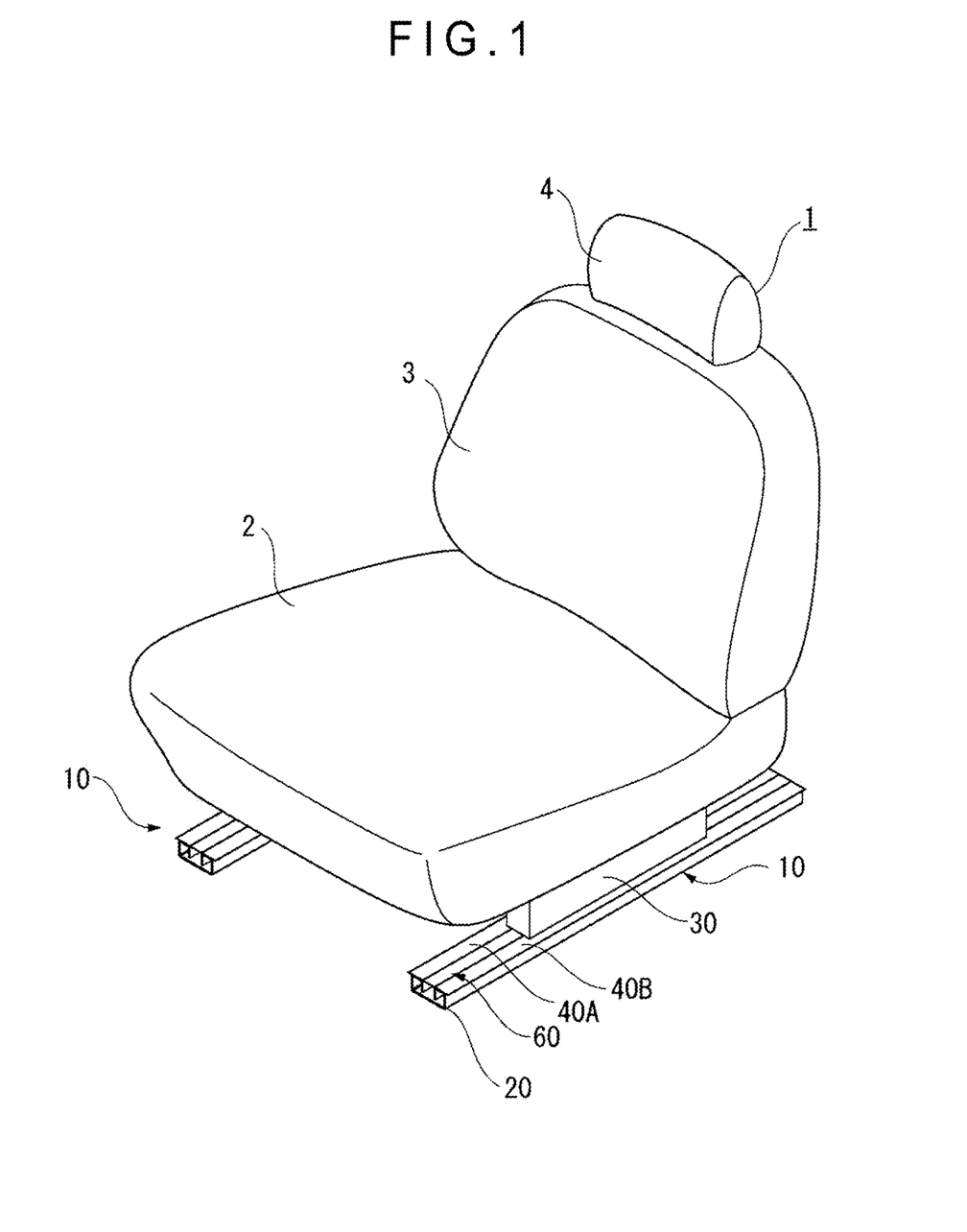
FIG. 1 is a perspective view showing a car seat installed with a motion guiding device according to a first exemplary embodiment.

As shown in FIGS. 1 to 6, a motion guiding device 10 according to the first exemplary embodiment is in a form of a slide rail device configured to guide a car seat 1 (seat) as a movable member in a front-back direction. As shown in FIG. 1, the car seat 1 includes: a seat cushion 2 forming a seat; a seatback 3 forming a seatback; and a headrest 4 for supporting a head of an occupant. In the figures, X, Y, Z directions are orthogonal to each other, in which the X direction is along a longitudinal direction of a lower rail 20 described below, the Y direction is along a width direction of the lower rail 20, and the Z direction is along a height direction of the lower rail 20.

Figure 2:
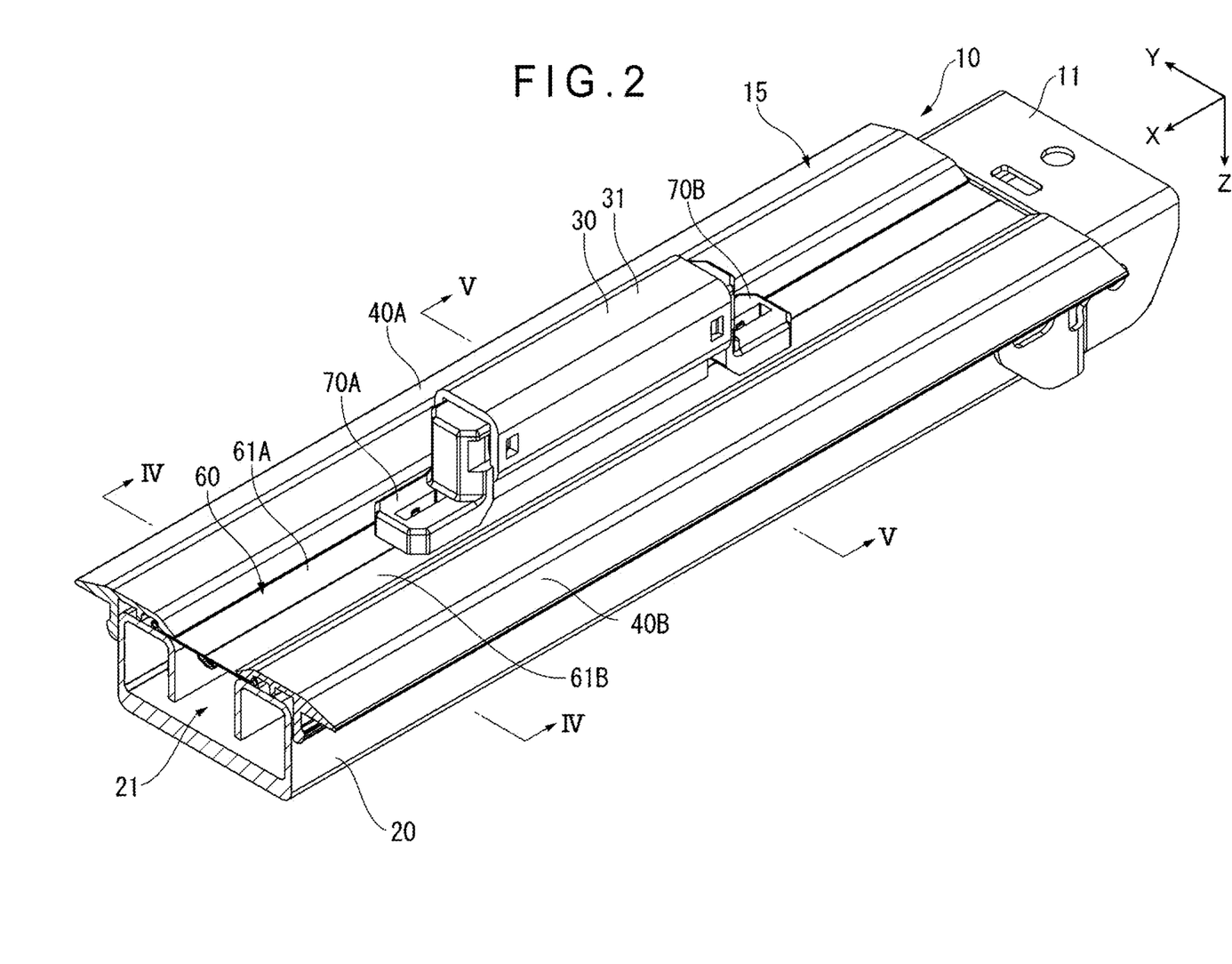
FIG. 2 is a perspective view showing the motion guiding device according to the first exemplary embodiment.
Figure 3:
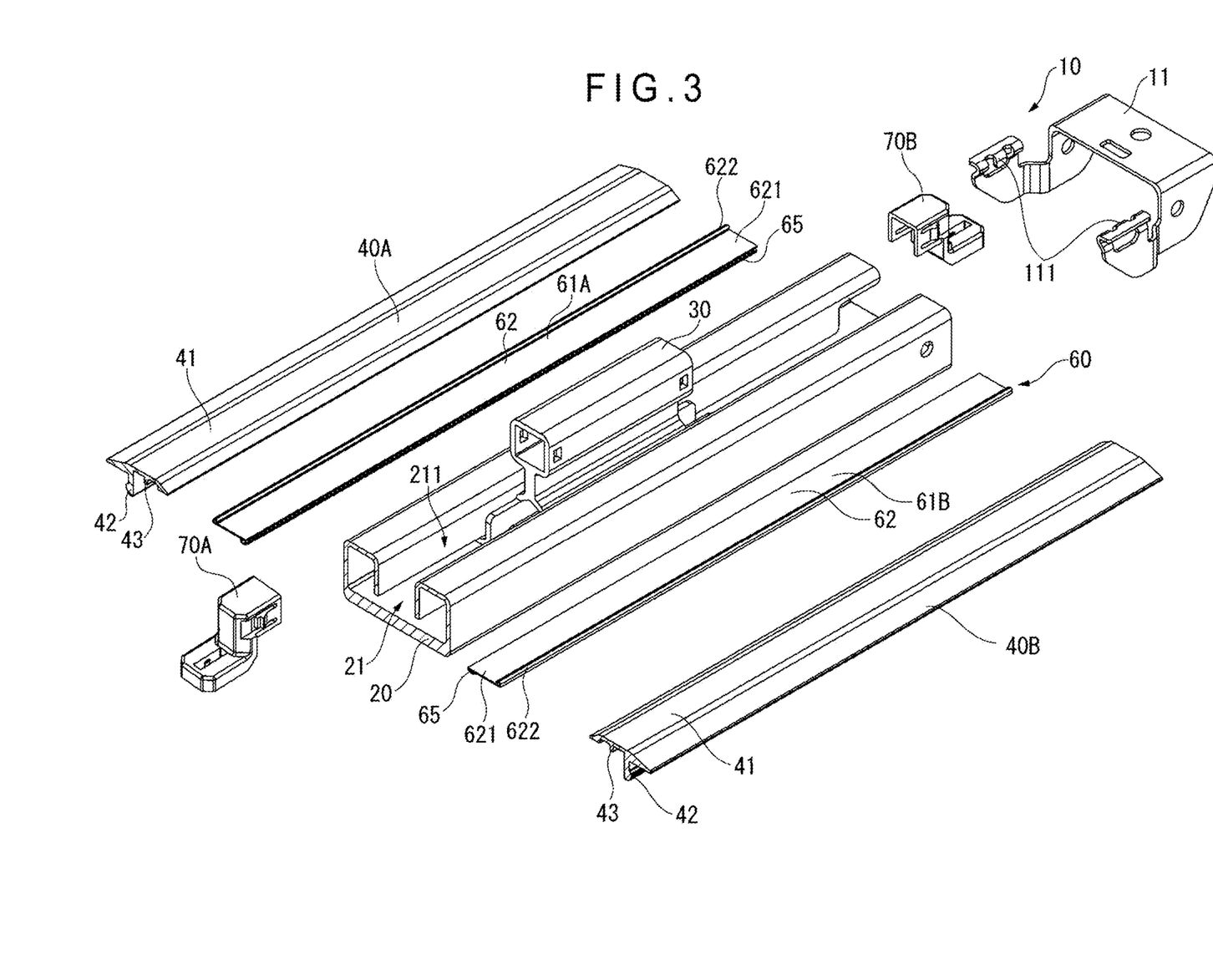
FIG. 3 is an exploded perspective view showing the motion guiding device according to the first exemplary embodiment.

As shown in FIGS. 2 and 3, the motion guiding device 10 includes: the lower rail 20 (i.e., base member) in which a guiding groove 21 is formed; an upper rail 30 (i.e., movable member) movably placed along the guiding groove 21; a first side cover 40A and a second side cover 40B defining an opening 211 of the guiding groove 21 therebetween; and a slide fastener 60 held by the first side cover 40A and the second side cover 40B.

Figure 4:
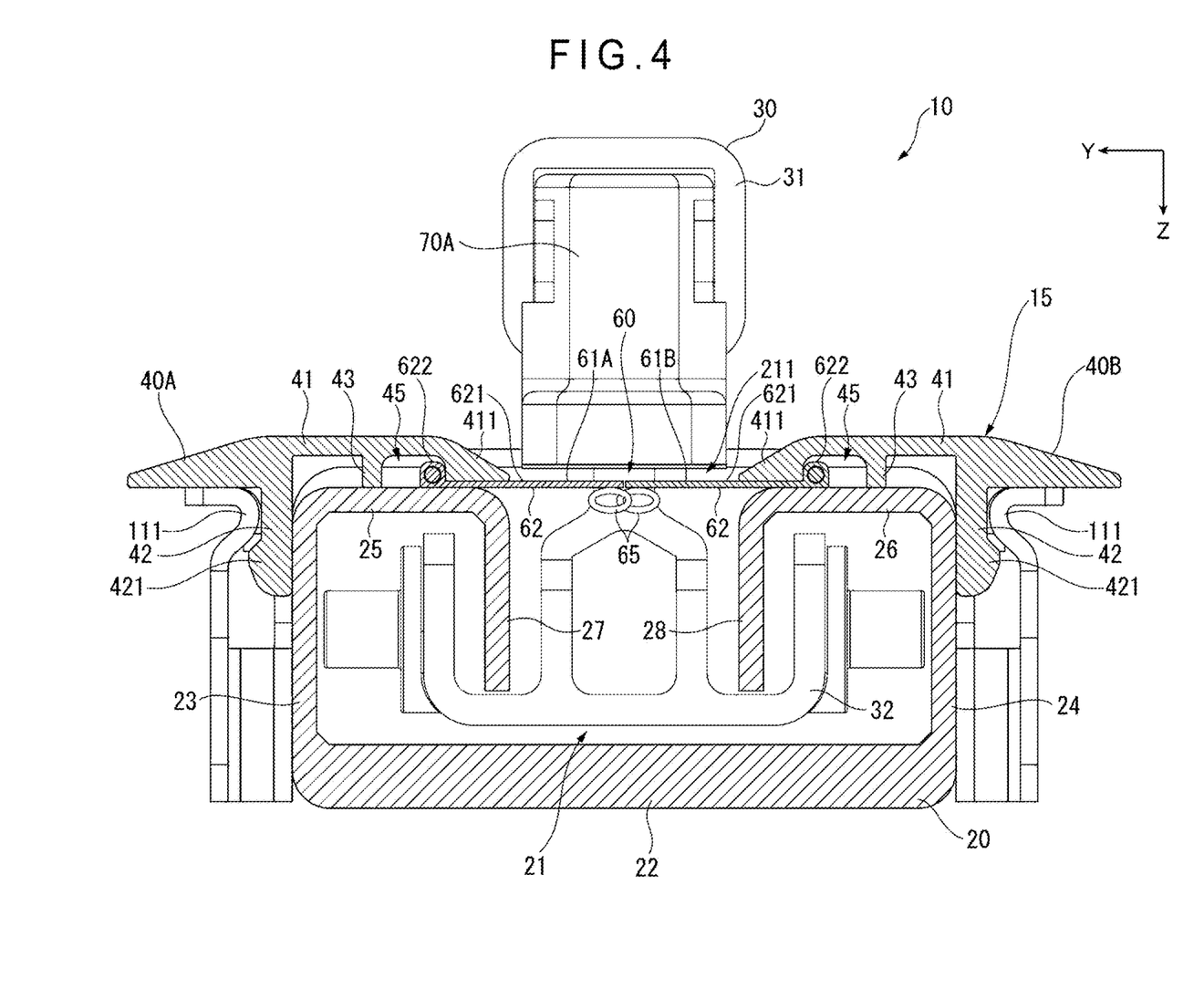
FIG. 4 is a cross-sectional view showing the motion guiding device taken along a IV-IV line in FIG. 2.
Figure 5:
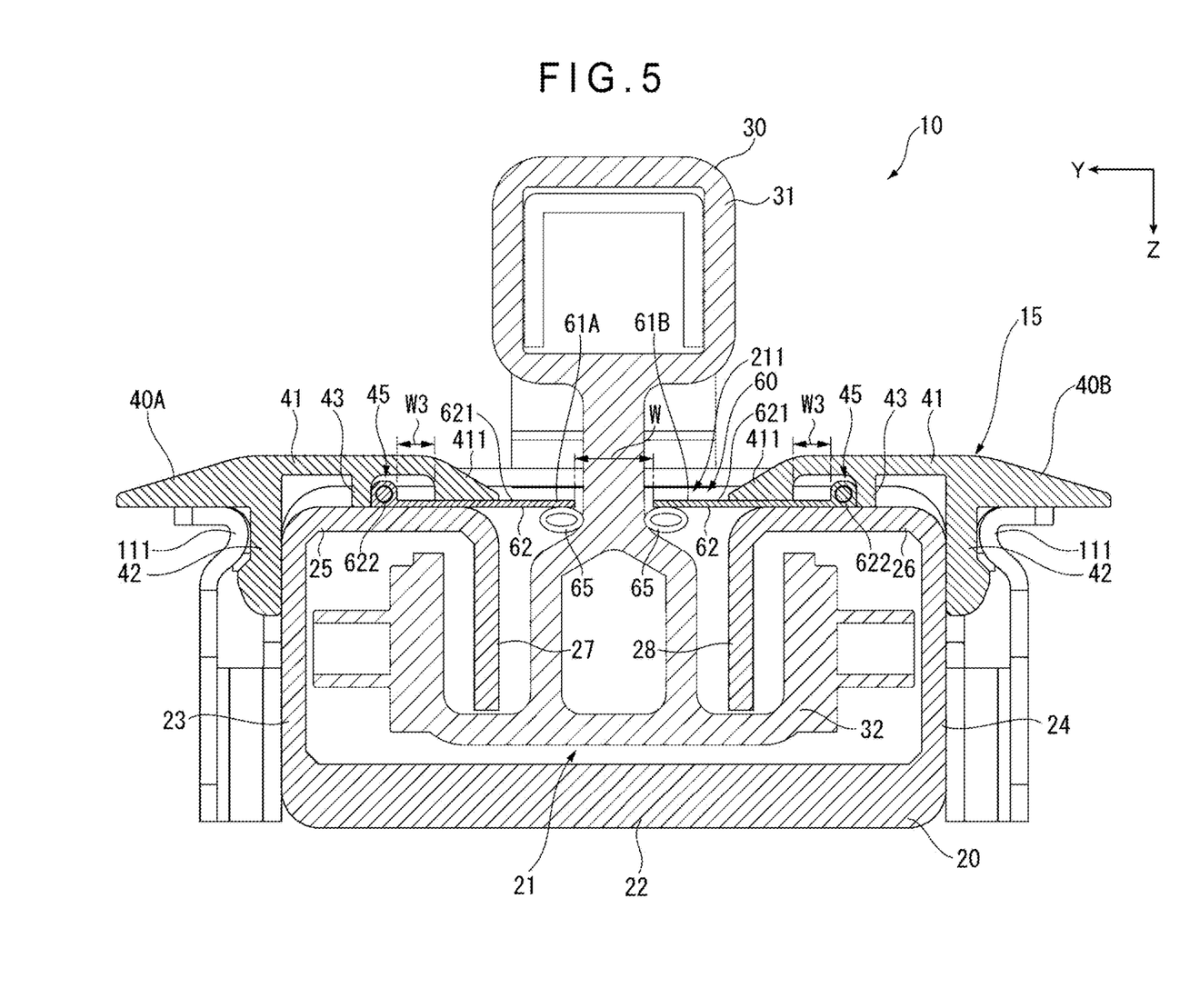
FIG. 5 is a cross-sectional view showing the motion guiding device taken along a V-V line in FIG. 2.

The lower rail 20, which is embedded in a floor of a car, includes: a bottom piece 22; a pair of side pieces 23, 24 extending upward from opposite ends of the bottom piece 22 along a longitudinal direction thereof; a pair of top pieces 25, 26 bent from upper edges of the respective side pieces 23, 24 in the Y direction; and a pair of rails 27, 28 extending downward from inner edges of the respective top pieces 25, 26, as shown in FIGS. 4 and 5. The side pieces 23, 24 are equal to each other in height in the Z direction. The top pieces 25, 26 are equal to each other in width in the Y direction. The bottom piece 22, the side pieces 23, 24 and the top pieces 25, 26 define the guiding groove 21. An opening 211 of the guiding groove 21 is defined between the top pieces 25, 26.

An end member 11 shown in FIGS. 2 and 3 are attached to each end of the lower rail 20 in the longitudinal direction thereof. An engagement piece 111 (see FIG. 3), which is to be engaged with a fixing piece 42 (described later) of each of the first side cover 40A and the second side cover 40B, is formed on the end member 11.

As shown in FIGS. 4 and 5, the upper rail 30 includes: an attachment portion 31 to which the seat cushion 2 of the car seat 1 is attached; and a rail 32 continuous to a lower surface of the attachment portion 31. As shown in FIG. 2, a first slider 70A and a second slider 70B (described later) are attached to opposite ends of the attachment portion 31 in the X direction. The rail 32, which is disposed in the guiding groove 21 of the lower rail 20, is fitted in the rails 27, 28 of the lower rail 20 in a manner to travel in the X direction.

Figure 6:
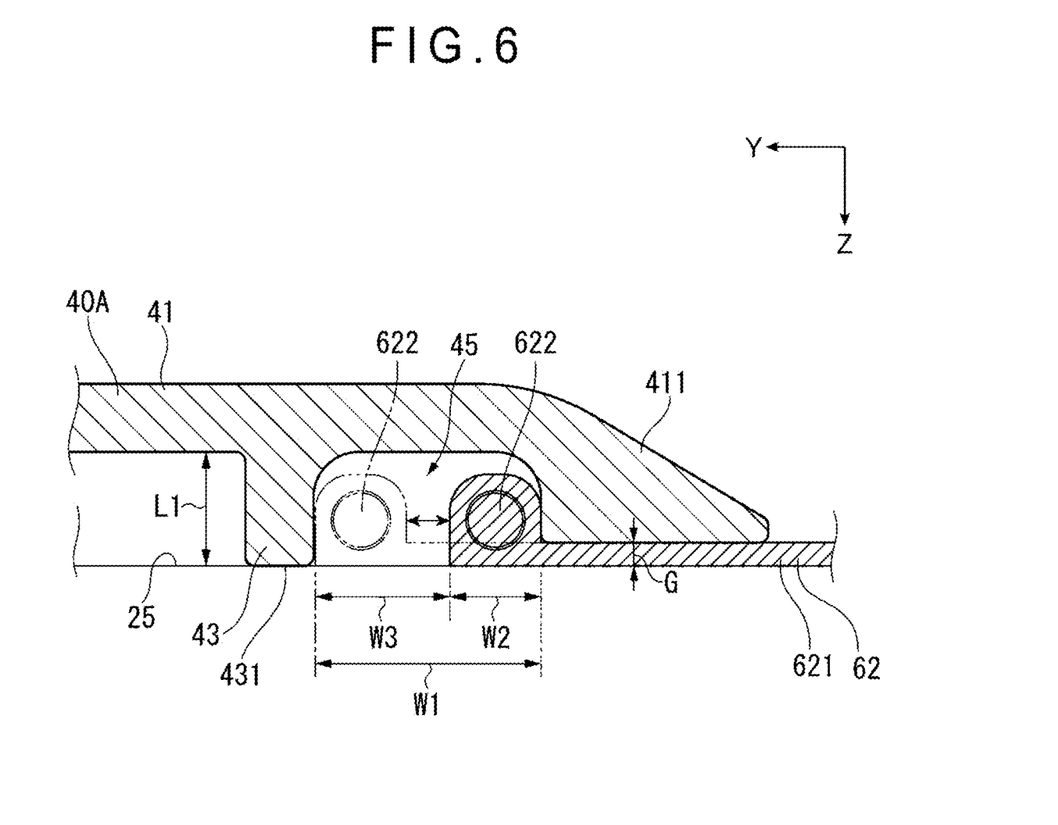
FIG. 6 is a cross-sectional view showing a relevant part of the motion guiding device according to the first exemplary embodiment.

As shown in FIGS. 4 to 6, the first side cover 40A has a substantially T-shaped cross section and includes a cover body piece 41 and a fixing piece 42 extending downward from a lower surface (i.e., a surface facing the lower rail 20) of the cover body piece 41.

The cover body piece 41 includes a rib 43 in a form of a support projection projecting downward from a lower surface of the cover body piece 41. The rib 43 extends along a longitudinal direction of the cover body piece 41 and is interposed between an edge 411 (which is at an inner side in the Y direction) and the fixing piece 42 of the cover body piece 41. The edge 411 is disposed along the opening 211. A tip end 431 of the rib 43 is formed at a position lower than the edge 411 and is in contact with the top piece 25. A concave groove 45 is formed between the rib 43 and the edge 411. The cover body piece 41 is formed such that an outer portion is thicker than an inner portion in the Y direction with respect to the fixing piece 42.

A lower end 421 of the fixing piece 42 bulges outward in the Y direction. The fixing piece 42 is inserted between the side piece 23 of the lower rail 20 and the engagement piece 111 of the end member 11, thereby being engaged with the engagement piece 111 as shown in FIG. 4, so that the fixing piece 42 is fixed to the lower rail 20.

The second side cover 40B and the first side cover 40A have the same arrangement. The first side cover 40A and the second side cover 40B in a pair are disposed mutually inversely in the right-and-left direction. Accordingly, the same reference signs are appropriately given to the same components in the drawings and the detailed description of the same components is omitted.

As shown in FIGS. 2 and 3, the slide fastener 60 includes: a first fastener stringer 61A held by the first side cover 40A; a second fastener stringer 61B held by the second side cover 40B; the first slider 70A attached to one end of the upper rail 30 in the X direction; and the second slider 70B of the other end of the upper rail 30 in the X direction. The first slider 70A and the second slider 70B have the same arrangement and are disposed in a pair in the X direction.

The first fastener stringer 61A includes: a fastener tape 62 covering the opening 211 of the guiding groove 21; and a fastener element 65 attached to the fastener tape 62 and to which the first slider 70A and the second slider 70B are slidably connected.

The fastener tape 62 includes: a tape portion 621 extending along the X direction; and a bulging portion 622 formed by a cord and the like at an outer edge of the tape portion 621 in the Y direction. The tape portion 621 is inserted through a gap between the edge 411 of the first side cover 40A and the top piece 25. The bulging portion 622 is disposed in the concave groove 45 in a manner to be able to contact with the edge 411 in the closing movement of the fastener tape 62.

The fastener tape 62 is movable in the Y direction to be opened and closed. When the bulging portion 622 is brought into contact with the edge 411 of the cover body piece 41, the fastener tape 62 is engaged with the first side cover 40A so as to avoid dropping off from the first side cover 40A.

The second fastener stringer 61B has the same arrangement as the first fastener stringer 61A. The first fastener stringer 61A and the second fastener stringer 61B in a pair are disposed mutually inversely in the right-and-left direction. Accordingly, the same reference signs are appropriately given to the same components in the drawings and the detailed description of the same components is omitted.

The first side cover 40A, the second side cover 40B and the slide fastener 60 define a groove shield unit 15.

As shown in FIG. 6, a dimension G of the gap between the top piece 25 and the edge 411 is larger than a thickness of the tape portion 621 of the fastener tape 62. A projection dimension L1 of the rib 43 (a dimension from the lower surface of the cover body piece 41 to an end surface of the rib 43) is equal to a depth of the concave groove 45. Accordingly, the dimension G is defined as a difference between the projection dimension L1 of the rib 43 and the dimension from the lower surface of the cover body piece 41 to the lower surface of the edge 411. A width W1 of the concave groove 45 in the Y direction is equal to a sum of a width W2 of the bulging portion 622 in the Y direction and a width W3 for the bulging portion 622 to be movable at the maximum in the Y direction. A dimension obtained by doubling the width W3 is equal to the width W that is the maximum opening width of the slide fastener 60 shown in FIG. 5.

Any slide fastener closeable and openable by the sliders 70A, 70B is usable as the the slide fastener 60. Accordingly, not only the later-described fastener elements 65 but also any fastener elements engageable and disengageable in a repeatable manner are usable. For instance, a rail faster in which fastener elements are brought into a concavo-convex engagement in a releasable manner is usable.

Operation of First Exemplary Embodiment

An operation of the motion guiding device 10 in the first exemplary embodiment will be described.

Firstly, when the car seat 1 moves in a front-and-back direction, the upper rail 30 moves in the X direction relative to the lower rail 20. At this time, the first slider 70A at a front side of the upper rail 30 in the moving direction releases the engagement of the fastener elements 65 as shown in FIG. 4 to separate the fastener elements 65, so that the right and left fastener tapes 62 are moved outward in the Y direction to open the slide fastener 60. With this operation, a side of the slide fastener 60 behind the first slider 70A is opened as shown in FIG. 5. Meanwhile, the second slider 70B at a rear side of the upper rail 30 in the moving direction establishes the engagement of the fastener elements 65 separated in the right-and-left direction as shown in FIG. 5, so that a side of the slide fastener 60 behind the second slider 70B is closed.

When the car seat 1 moves in a reverse direction from the above-described moving direction, the second slider 70B is located at a front position and the first slider 70A is located at a rear position in the moving direction of the upper rail 30. The operations of the first slider 70A and the second slider 70B are substantially the same as the above-described operations. When the upper rail 30 is thus moved in the X direction, the slide fastener 60 is opened only at a part corresponding to the opening 211 of the guiding groove 21 where the upper rail 30 is currently present and the rest of the slide fastener 60 is kept closed, so that the opening 211 is kept closed by the slide fastener 60. Accordingly, a small substance can be prevented from entering the guiding groove 21 and foreign substances (e.g., dirt) can be prevented from accumulating in the guiding groove 21 to disturb the movement of the upper rail 30. Moreover, since the fastener tape 62 is hardly bent by the opening and closing movement, a material of the fastener tape 62 can be a resin material that is harder than a fabric material and the fastener tape 62 can be structured so as to be unlikely to drop into the guiding groove 21 even when the fastener tape 62 is pressed from an outside. For instance, the fastener tape 62 can be provided by a single body made of a synthetic resin or a composite of a synthetic resin and a fabric.

Advantages of First Exemplary Embodiment (1) Since a single cover body piece 41 has the parts (concave groove 45, edge 411) engaged with the fastener tape 62, the thickness of the body of the first side cover 40A (the second side cover 40B) is reducible to be slim, as compared with a body entirely formed substantially in a square C-shape or C-shape.

Moreover, since the fixing piece 42 of the first side cover 40A (the second side cover 40B) is fixed to the lower rail 20 and the rib 43 projecting from the lower surface of the cover body piece 41 in contact with the lower rail 20 supports the cover body piece 41, the cover body piece 41 can be prevented from being bent by an external force applied to the cover body piece 41 when a person steps on the cover body piece 41. Accordingly, resistance of the fastener tape 62 to the opening and closing movement, which is caused by the cover body piece 41 being pressed onto the fastener tape 62, can be avoided from increasing, so that the motion guiding device 10 can smoothly work.

(2) During the opening and closing movement of the fastener tape 62 in accordance with the movement of the upper rail 30, the bulging portion 622 slides between the edge 411 and the rib 43 within the concave groove 45. Accordingly, the fastener tape 62 can be avoided from being bent by being pressed onto the first side cover 40A (second side cover 40B) by the opening movement.

Moreover, when the bulging portion 622 is in contact with the edge 411 of the cover body piece 41, the fastener tape 62 is in engagement with the first side cover 40A (second side cover 40B), so that the fastener tape 62 can be avoided from dropping off.

(3) Since the rib 43 is continuous in the longitudinal direction of the cover body piece 41, the rib 43 can be in contact with the lower rail 20 in the longitudinal direction of the cover body piece 41, so that the rib 43 can support the cover body piece 41 more firmly than, for instance, the support projection partially in contact with the lower rail 20 in the longitudinal direction of the cover body piece 41.

Second Exemplary Embodiment

A motion guiding device 10A according to a second exemplary embodiment of the will be described below.

Figure 7:
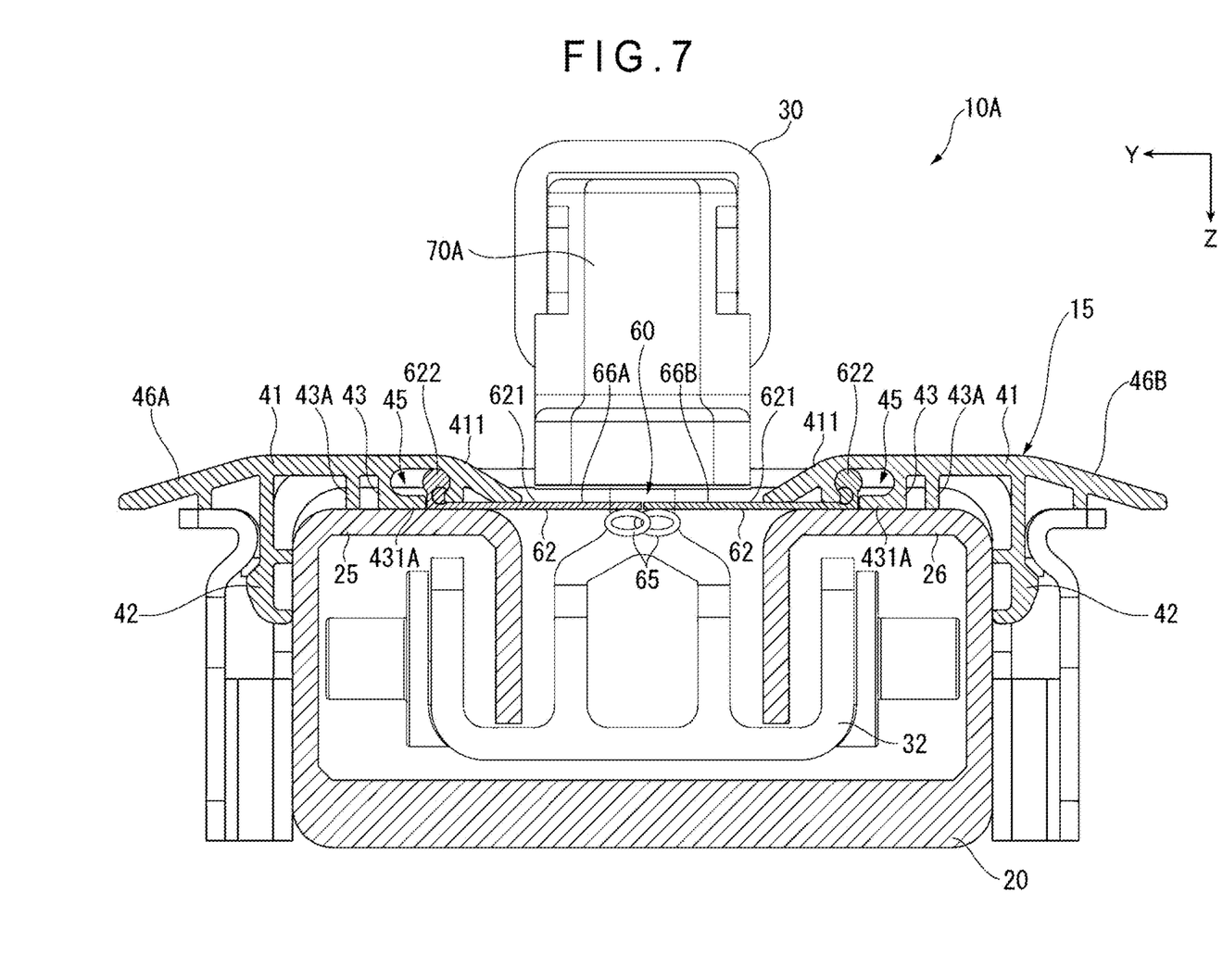
FIG. 7 is a cross-sectional view showing a motion guiding device according to a second exemplary embodiment.

As shown in FIG. 7, the motion guiding device 10A has substantially the same arrangement as the motion guiding device 10A in the first exemplary embodiment, but is different in including a first fastener stringer 66A, a second fastener stringer 66B, a first side cover 46A and a second side cover 46B in place of the first fastener stringer 61A, the second fastener stringer 61B, the first side cover 40A and the second side cover 40B.

The first fastener stringer 66A includes the above-described fastener element 65 and the fastener tape 62 in which the tape portion 621 is bent at an outer edge in the Y direction and the bulging portion 622 is disposed at a tip of the edge.

The first side cover 46A includes the cover body piece 41, the fixing piece 42, and the rib 43 having a tip end 431A extending toward the edge 411. In addition to the rib 43, the first side cover 46A further includes a rib 43A formed between the rib 43 and the fixing piece 42 in a manner to be in contact with the top piece 25. Herein, an opening dimension between the tip end 431A of the rib 43 and the edge 411 (an opening dimension in the Y direction in this arrangement) is set smaller than a diameter of the bulging portion 622. The tip end 431A of the rib 43 is provided under the edge 411.

Arrangements of the second fastener stringer 66B and the second side cover 46B are the same as those of the first fastener stringer 66A and the first side cover 46A, respectively, and are inversely located in the right-and-left direction.

In the motion guiding device 10A, the bulging portion 622 slides farther in the Y direction into the concave groove 45 in accordance with the opening and closing movement of the fastener tape 62. With the arrangement of the motion guiding device 10A, since the opening between the tip end 431A of the rib 43 and the edge 411 of the cover body piece 41 is formed narrow, the bulging portion 622 of the fastener tape 62 does not drop off from the concave groove 45 of the first side cover 46A (second side cover 46B). Accordingly, the slide fastener 60, the first side cover 46A and the second side cover 46B can be handled in a combined state, which facilitates setting of the slide fastener 60 and attaching of the first side cover 46A and the second side cover 46B to the lower rail 20.

Third Exemplary Embodiment

A motion guiding device according to a third exemplary embodiment of the will be described below.

Figure 8:
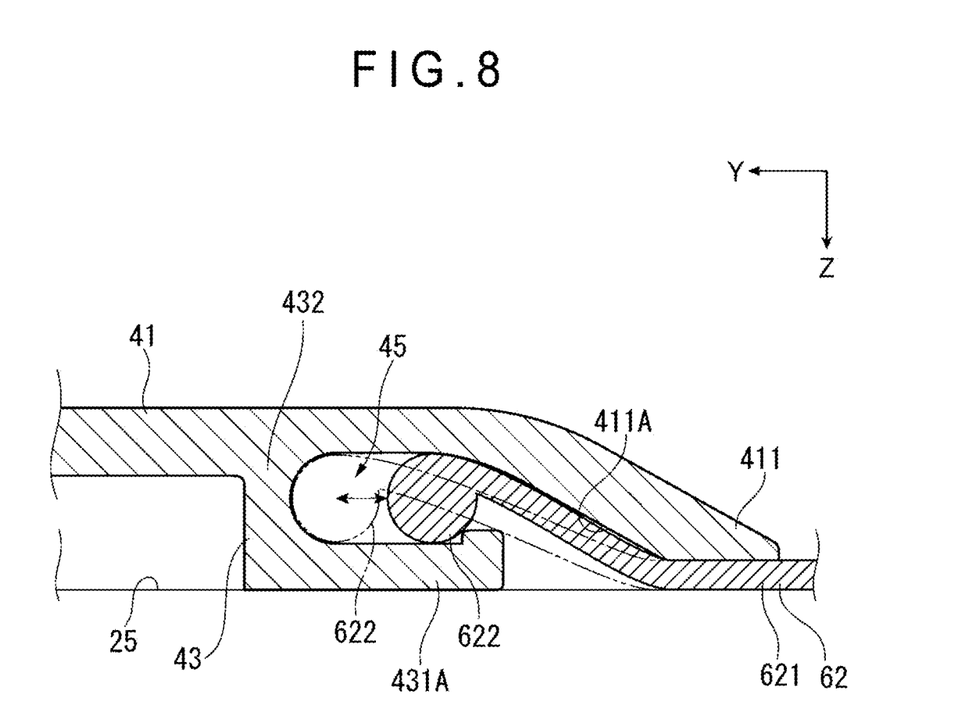
FIG. 8 is a cross-sectional view showing a relevant part of a motion guiding device according to a third exemplary embodiment.

A motion guiding device according to the third exemplary embodiment is substantially the same as the motion guiding device 10 according to the first exemplary embodiment, but is different, as shown in FIG. 8, in that the tip end 431A of the rib 43 extends toward the edge 411 of the cover body piece 41, that an inclined surface 411A is formed on the edge 411, and that the bulging portion 622 of the fastener tape 62 is eccentric downward (toward the tip end 431A) with respect to the tape portion 621. The inclined surface 411A, which is defined by an inner surface forming the concave groove 45 of the edge 411, extends toward the rib 43 with an inclination directed from the tip end 431A to a base end 432.

With this motion guiding device, the tip end 431A of the rib 43 extends toward the edge 411. Accordingly, even when the fastener tape 62 is bent in order to dispose the bulging portion 622 into the concave groove 45, the inclined surface 411A enables the fastener tape 62 to be guided in a direction for the opening and closing movement, so that the slide fastener 60 can be smoothly opened and closed. Herein, an opening dimension between the tip end 431A of the rib 43 and the edge 411 (an opening dimension in the Z direction in this arrangement) is set smaller than a diameter of the bulging portion 622.

Fourth Exemplary Embodiment

A motion guiding device according to a fourth exemplary embodiment of the will be described below.

Figure 9:
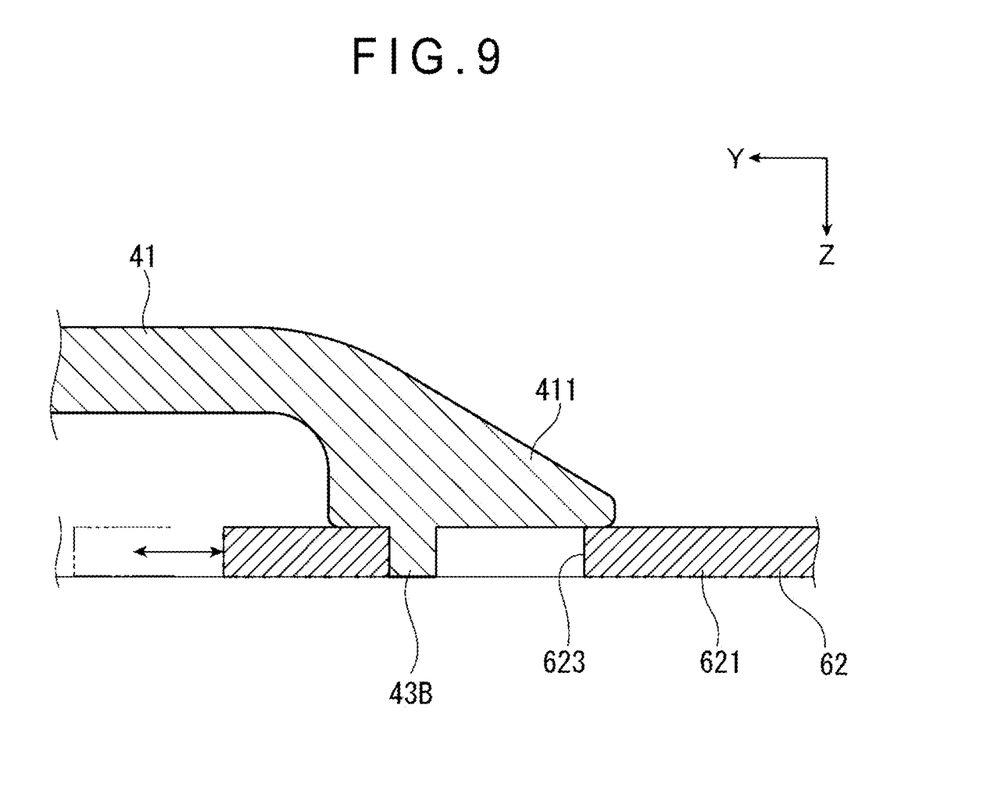
FIG. 9 is a cross-sectional view showing a relevant part of a motion guiding device according to a fourth exemplary embodiment.
Figure 10:
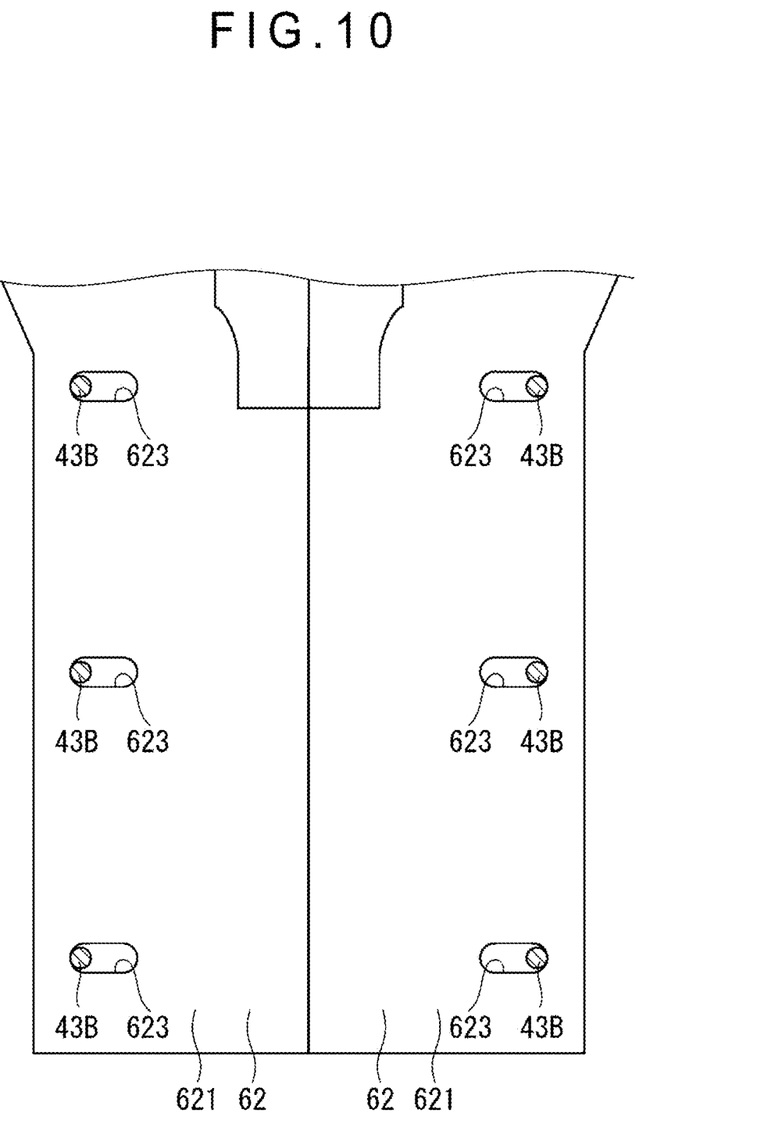
FIG. 10 is an illustration for describing the relevant part of the motion guiding device according to the fourth exemplary embodiment.

A motion guiding device according to the fourth exemplary embodiment is substantially the same as the motion guiding device 10 according to the first exemplary embodiment, but is different, as shown in FIGS. 9 and 10, in that the cover body piece 41 includes a plurality of support projections 43B projecting from the lower surface of the edge 411 in place of the rib 43 and the fastener tape 62 includes a plurality of elongated holes 623 formed on the tape portion 621 in place of the bulging portion 622. The plurality of support projections 43B are aligned along the longitudinal direction of the cover body piece 41 while being disposed in the respective elongated holes 623. The plurality of elongated holes 623 are provided along the opening and closing movement direction of the fastener tape 62 (i.e., along the Y direction).

With this motion guiding device, since the fastener tape 62 is capable of the opening and closing movement within a range in which the support projections 43B are in no contact with longitudinal ends of the elongated holes 623, the fastener tape 62 can be avoided from being bent by being pressed onto the first side cover 40A (second side cover 40B) by the opening movement.

Moreover, when the support projections 43B are brought into contact with the longitudinal ends of the elongated holes 623, the fastener tape 62 is engaged with the first side cover 40A (second side cover 40B), so that the fastener tape 62 can be avoided from dropping off.

Further, since the concave groove 45 is not required to be formed between the edge 411 and the support projections 43B in the cover body piece 41, the width of the cover body piece 41 in the Y direction is reducible.

Modification(s)

The invention is not limited to the arrangements described in the above exemplary embodiments, but includes modifications as long as the modifications are compatible with the invention.

For instance, the first side covers 40A, 46A and the second side covers 40B, 46B in the above exemplary embodiments are made of aluminum or a hard resin material in some embodiments.

Moreover, the first side covers 40A, 46A and the second side covers 40B, 46B in a substantially T-shape in cross section are formed in a substantially L-shape in cross section in some embodiments. In this arrangement, an outer part of the cover body piece 41, which is at an outer position in the Y direction with respect to the fixing piece, is omitted.

In the above exemplary embodiments, the motion guiding devices 10, 10A configured to guide the car seat 1 are described. In some embodiments, the motion guiding device is configured to guide a console box, or configured to guide a headrest, a shift lever and the like, or alternatively, is used as a guiding portion of an article delivery device, a motion guiding portion of a machine tool, and other various guiding portions which are used in a factory and the like.

The invention claimed is:

1. A motion guiding device comprising:
a base member formed with a guiding groove;
a movable member movably disposed along the guiding groove;
a pair of side covers defining an opening of the guiding groove therebetween; and
a slide fastener comprising a pair of fastener stringers held by the pair of side covers and a pair of sliders attached to opposite ends of the movable member in a moving direction,
each of the pair of fastener stringers comprising: a fastener tape covering the opening of the guiding groove; and a fastener element provided to the fastener tape and connected with the pair of sliders such that the pair of sliders are slidable,
each of the pair of side covers comprising: a cover body piece engaged with the fastener tape such that the fastener tape is movable in a direction intersecting with a moving direction of the movable member to open and close the slide fastener; and a fixing piece extending from the cover body piece and fixed to the base member,
the cover body piece comprising: a support projection projecting from a surface of the cover body piece and formed at a position closer to the fastener tape with respect to the fixing piece.

2. The motion guiding device according to claim 1, wherein
the cover body piece further comprises: an edge at a position closer to the fastener tape with respect to the fixing piece; and a concave groove formed between the edge and the support projection, and
the fastener tape comprises a bulging portion located in the concave groove.

3. The motion guiding device according to claim 2, wherein
the support projection comprises a tip end extending toward the edge of the cover body piece, and a dimension of an opening defined between the tip end and the edge is smaller than a diameter of the bulging portion.

4. The motion guiding device according to claim 3, wherein
the edge of the cover body piece comprises an inclined surface on an inner surface forming the concave groove, the inclined surface extending toward the support projections with an inclination directed from the tip end of the support projection to a base end.

5. The motion guiding device according to claim 1, wherein
the support projection is continuous in a longitudinal direction of the cover body piece.

6. The motion guiding device according to claim 1, wherein
the fastener tape comprises at least one elongated hole along a moving direction of the fastener tape to open and close the slide fastener, and
the support projection is disposed in the elongated hole.

7. A groove shield unit comprising:
a pair of side covers; and
a slide fastener comprising a pair of fastener stringers held by the pair of side covers and a pair of sliders connected to the pair of fastener stringers,
each of the pair of fastener stringers comprising: a fastener tape; and a fastener element provided to the fastener tape and connected with the pair of sliders such that the pair of sliders are slidable,
each of the pair of side covers comprising: a cover body piece engaged with the fastener tape such that the fastener tape is movable to open and close the slide faster; and a fixing piece extending from the cover body piece,
the cover body piece comprising: a support projection projecting from a surface of the cover body piece and formed at a position closer to the fastener tape with respect to the fixing piece.

8. The groove shield unit according to claim 7, wherein
the cover body piece further comprises: an edge at a position closer to the fastener tape with respect to the fixing piece; and a concave groove formed between the edge and the support projection,
the fastener tape comprises a bulging portion located in the concave groove, and
the support projection comprises a tip end extending toward the edge of the cover body piece.

* * * * *

UNITED STATES PATENT AND TRADEMARK OFFICE
CERTIFICATE OF CORRECTION

PATENT NO. : 11,267,369 B2
APPLICATION NO. : 16/610858
DATED : March 8, 2022
INVENTOR(S) : Tsutomu Yamada et al.

It is certified that error appears in the above-identified patent and that said Letters Patent is hereby corrected as shown below:

In the Specification

In Column 3, Line 56, delete "faster;" and insert -- fastener; --.

In Column 6, Line 64, delete "the the" and insert -- the --.

In Column 6, Line 67, delete "faster" and insert -- fastener --.

In the Claims

In Column 12, Line 8, in Claim 7, delete "faster;" and insert -- fastener; --.

Signed and Sealed this
Seventeenth Day of May, 2022

Katherine Kelly Vidal
*Director of the United States Patent and Trademark Office*